(12) United States Patent
Parry et al.

(10) Patent No.: US 7,054,972 B2
(45) Date of Patent: May 30, 2006

(54) APPARATUS AND METHOD FOR DYNAMICALLY ENABLING AND DISABLING INTERRUPT COALESCING IN DATA PROCESSING SYSTEM

(75) Inventors: Owen N. Parry, Colorado Springs, CO (US); Brad D. Besmer, Colorado Springs, CO (US); Stephen B. Johnson, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 314 days.

(21) Appl. No.: 10/319,206

(22) Filed: Dec. 13, 2002

(65) Prior Publication Data

US 2004/0117534 A1 Jun. 17, 2004

(51) Int. Cl.
*G06F 13/24* (2006.01)
(52) U.S. Cl. .................. 710/260; 710/36; 710/264
(58) Field of Classification Search ........ 710/260–266, 710/36
See application file for complete search history.

(56) References Cited

U.S. PATENT DOCUMENTS

| 5,892,979 | A  | * | 4/1999  | Shiraki et al.      | 710/52  |
| 6,012,121 | A  | * | 1/2000  | Govindaraju et al.  | 710/260 |
| 6,065,089 | A  | * | 5/2000  | Hickerson et al.    | 710/266 |
| 6,189,066 | B1 |   | 2/2001  | Lowe et al.         | 710/260 |
| 6,467,008 | B1 | * | 10/2002 | Gentry et al.       | 710/261 |
| 6,615,305 | B1 | * | 9/2003  | Olesen et al.       | 710/262 |

* cited by examiner

*Primary Examiner*—Khanh Dang
*Assistant Examiner*—Kim T. Huynh
(74) *Attorney, Agent, or Firm*—Suiter West Swantz PC LLO

(57) ABSTRACT

An apparatus and method for dynamically enabling and disabling interrupt coalescing in a data processing system. The present invention involves consistently monitoring IO load on an IOP of an IO adapter. The firmware on the IO adapter may have a global variable that stores counters for PCI function registers. Each counter tracks the number of outstanding IOs of a corresponding PCI function register. The counter is incremented whenever a new IO is received and is decremented upon posting the completed message back to the OS. A timer interrupt is generated periodically so that an ISR may be periodically performed. In the ISR, the maximum value stored of each counter seen since last timer interrupt is analyzed. When the maximum value stored is greater than a predetermined threshold value, the interrupt coalescing is enabled.

15 Claims, 5 Drawing Sheets

```
/****************************************************
 *                                                  *
 *              Dynamic Interrupt Coalescing        *
 *                                                  *
 ****************************************************/ if (MAX OUTSTANDING IO COUNT less than DYNAMIC_COALESCING_THRESHOLD_MIN)
{
    if (INTERRUPT_COALESCING_ON)
    {
        DISABLE INTERRUPT COALESCING
    }
}
else if (MAX OUTSTANDING IO COUNT greater than DYNAMIC_COALESCING_THRESHOLD_MAX)
{
    if (INTERRUPT COALESCING OFF)
    {
        SET INTERRUPT COALESCING VARIABLES
        ENABLE INTERRUPT COALESCING
    }
}

RESET MAX OUTSTANDING IO COUNT

/****************************************************
 *                                                  *
 *           End Dynamic Interrupt Coalescing       *
 *                                                  *
 ****************************************************/
```

*FIG. 5*

APPARATUS AND METHOD FOR DYNAMICALLY ENABLING AND DISABLING INTERRUPT COALESCING IN DATA PROCESSING SYSTEM

FIELD OF THE INVENTION

This invention relates generally to a data processing system, and particularly to an apparatus and method for dynamically enabling and disabling interrupt coalescing in a data processing system.

BACKGROUND OF THE INVENTION

In a data processing system such as a workstation or personal computer, an input/output (IO) adapter such as a SCSI controller may be present as an interface device that is located between a peripheral device, e.g., a disk drive, and an IO bus of the workstation or personal computer for connection with the peripheral device. When an IO operation such as reading some data into a host processor of the data processing system from the disk drive is completed, an interrupt may be generated by the IO adapter. An interrupt is an IO adapter's request for attention from the host processor. When the host processor receives an interrupt, the host processor suspends its current operations, saves the status of its work, and transfers control to a special routine known as an interrupt service routine (ISR). An ISR contains the instructions for dealing with the particular situation that caused the interrupt. Interrupts may be generated by various hardware devices to request service or report problems, or by the host processor itself in response to program errors or requests for operating system services. Interrupts are the host processor's way of communicating with the active elements that comprise a data processing system.

In processing an interrupt, overhead is present which may reduce the processing efficiency of the data processing system. IO interrupt processing overhead typically includes (1) saving the application's current state, (2) executing the IO ISR, and then (3) restoring the application's state so execution may continue from where it was interrupted. ISR is a special routine that is executed upon an occurrence of a specific interrupt. Interrupts from different sources have different ISRs to carry out processes to handle the interrupt. These ISRs may include, for example, updating a system clock, or reading the keyboard. The occurrence of multiple IO interrupts increases the amount of overhead used to process these interrupts. This situation may decrease the efficiency of the data processing system, especially when many interrupts occur frequently.

In an attempt to alleviate the problem of excessive host processor utilization and overhead due to frequent interrupt generation, one conventional approach employs interrupt coalescing. In such an approach, groups of events (e.g. IO completion events, and the like) are stored or "coalesced", and a single interrupt is generated once a selected number of the events are obtained. Instead of generating an interrupt each time an IO completion event occurs, an interrupt coalesced approach only generates an interrupt when, for example, five IO completion events have been coalesced. In such an approach, the host processor overhead associated with servicing IO completion events is reduced.

Although interrupt coalescing may reduce host processor utilization and overhead, the benefit of interrupt coalescing may nevertheless be marginalized with large IOs and may have a negative impact on performance when serialized IOs are the dominant IO load. A conventional approach used to solve these problems is to simply disable the interrupt coalescing feature entirely. However, with interrupt coalescing disabled, maximum performance of the adapter may not be achieved with small block data transfers, due to inefficient utilization of the data transfer mechanisms across the IO bus of the workstation or personal computer.

Therefore, it would be advantageous to have an apparatus and method for dynamically enabling and disabling interrupt coalescing in a data processing system so that maximum performance may be maintained and overall IO throughput may therefore be improved, regardless of differences in IO characteristics.

SUMMARY OF THE INVENTION

Accordingly, the present invention is directed to a method and apparatus for dynamically enabling and disabling interrupt coalescing in a data processing system. The present invention involves consistently monitoring IO load on an input/output processor (IOP), and dynamically enabling and disabling interrupt coalescing based on IO load characteristics.

According to a first aspect of the present invention, an exemplary method for dynamically enabling and disabling interrupt coalescing in a data processing system includes the following steps: monitoring IO load on an IOP; and enabling the interrupt coalescing when the IO load is greater than a predetermined threshold value.

According to an additional aspect of the present invention, an exemplary method for dynamically enabling and disabling interrupt coalescing in a data processing system includes the following steps: providing a counter suitable for tracking IO load of an IOP, wherein the counter is incremented when a new IO request is received by the IOP, and is decremented when the IOP posts a completed message back to a host processor; generating a timer interrupt periodically so that an ISR is periodically performed; comparing a current value of the counter with a store of a highest value of the counter seen since last timer interrupt when the IOP iterates a polling loop, wherein the current value becomes a maximum value stored when the current value is greater, and the highest value is the maximum value stored when the current value is not greater; comparing the maximum value stored with a predetermined threshold value in the ISR; and enabling the interrupt coalescing when the maximum value stored is greater than the predetermined threshold value.

According to a further aspect of the present invention, an exemplary apparatus for dynamically enabling and disabling interrupt coalescing in a data processing system includes: a host processor including a PCI (peripheral component interconnect) function register; a counter suitable for tracking a number of outstanding IO load of the PCI function register, wherein the counter is incremented when a new IO request is received, and is decremented upon posting a completed message back to the host processor; an IO adapter coupled to the host processor, wherein the IO adapter includes an IOP suitable for enabling and disabling interrupt coalescing and suitable for iterating a polling loop, and wherein firmware on the IO adapter has a global variable that stores the counter; means for generating a timer interrupt periodically so that an ISR is periodically performed; means for comparing a current value of the counter with a store of a highest value of the counter seen since last timer interrupt when the IOP iterates the polling loop, wherein the current value becomes a maximum value stored when the current value is greater, and the highest value is the maximum value stored when the current value is not greater; and means for comparing the maximum value stored with a predetermined threshold value in the ISR.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 5 is an exemplary "C" pseudo code used to demonstrate the algorithm described in FIG. 4.

DETAILED DESCRIPTION OF THE INVENTION

Reference will now be made in detail to the presently preferred embodiments of the invention, examples of which are illustrated in the accompanying drawings.

Figure 1:
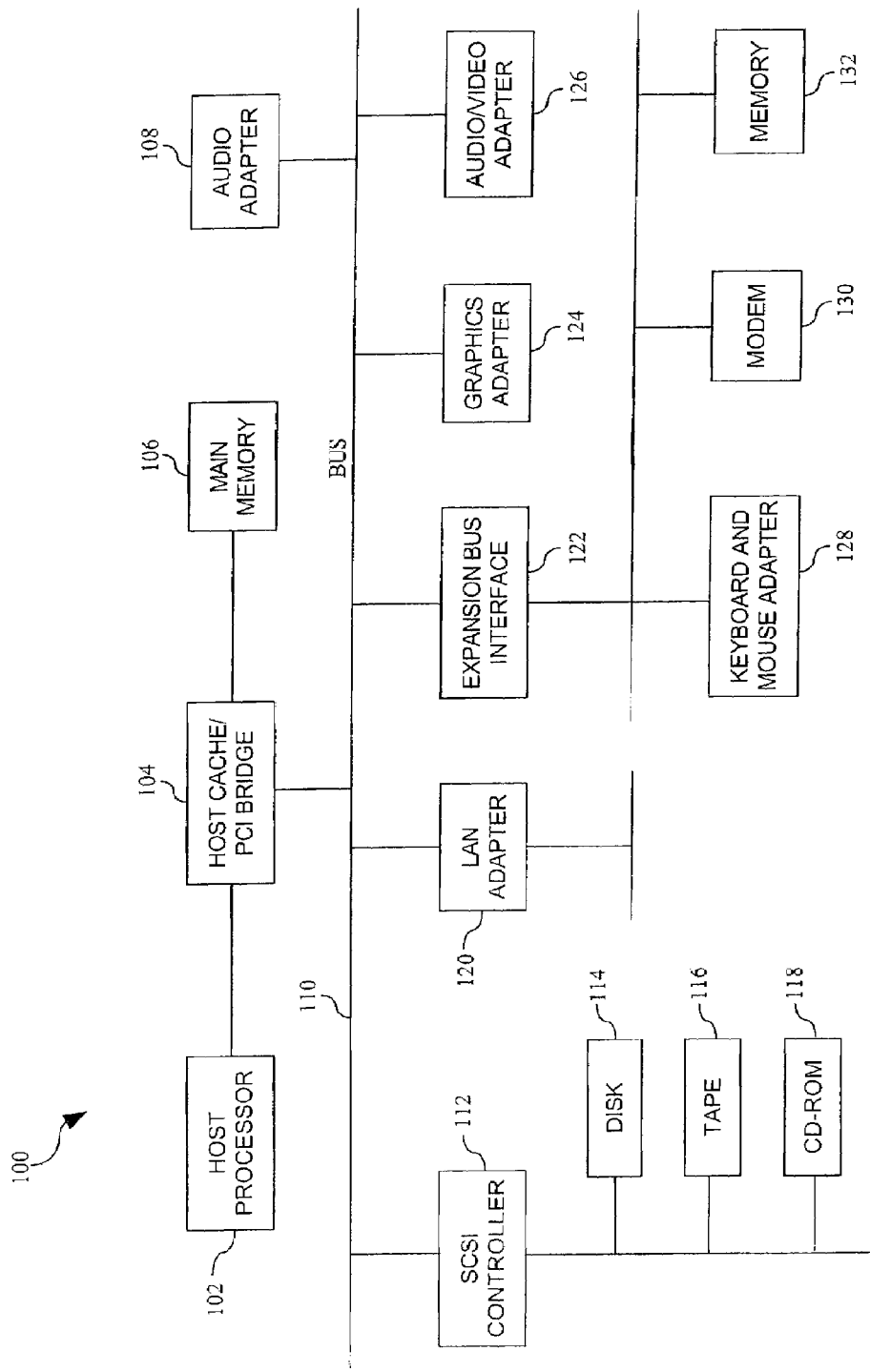
FIG. 1 is a block diagram of an exemplary data processing system in which the present invention may be implemented.

Referring first to FIG. 1, a block diagram of an exemplary data processing system 100 in which the present invention may be implemented is illustrated. The data processing system 100 may employ a PCI (or PCI-X) local bus architecture. Although the depicted example employs a PCI bus, other bus architectures such as Micro Channel and ISA may be used. A host processor 102 and a main memory 106 may be connected to a PCI local bus 110 through a PCI bridge 104. The PCI bridge 104 may also include an integrated memory controller and cache memory for the host processor 102. Additional connections to the PCI local bus 110 may be made through direct component interconnection or through add-in boards. In the depicted example, a SCSI controller 112, a LAN adapter 120, and an expansion bus interface 122 may be connected to the PCI local bus 110 by direct component connection. In contrast, an audio adapter 108, a graphics adapter 124, and an audio/video adapter (A/V) 126 may be connected to the PCI local bus 110 by add-in boards inserted into expansion slots. The Expansion bus interface 122 may provide a connection for a keyboard and mouse adapter 128, a modem 130, and an additional memory 132. The SCSI controller 112 may provide a connection for a hard disk drive 114, a tape drive 116, and a CD-ROM 118 in the depicted example. Typical PCI local bus implementations may support three or four PCI expansion slots or add-in connectors. Those of ordinary skill in the art will appreciate that the hardware shown in FIG. 1 may vary. For example, other peripheral devices, such as optical disk drives and the like may be used in addition to or in place of the hardware depicted in FIG. 1. The depicted example is not meant to imply architectural limitations with respect to the present invention.

The present invention provides a method and apparatus for dynamically enabling and disabling interrupt coalescing in a data processing system in a manner that efficiently balances performance and latency within the data processing system. Latency with respect to IO tasks is defined as the elapsed time from the file system IO request until the file system IO completion. The processes of the present invention may be implemented within various IO adapters in the data processing system 100, such as the LAN adapter 120, the graphics adapter 124, and the SCSI controller 112 shown in FIG. 1.

Figure 2:
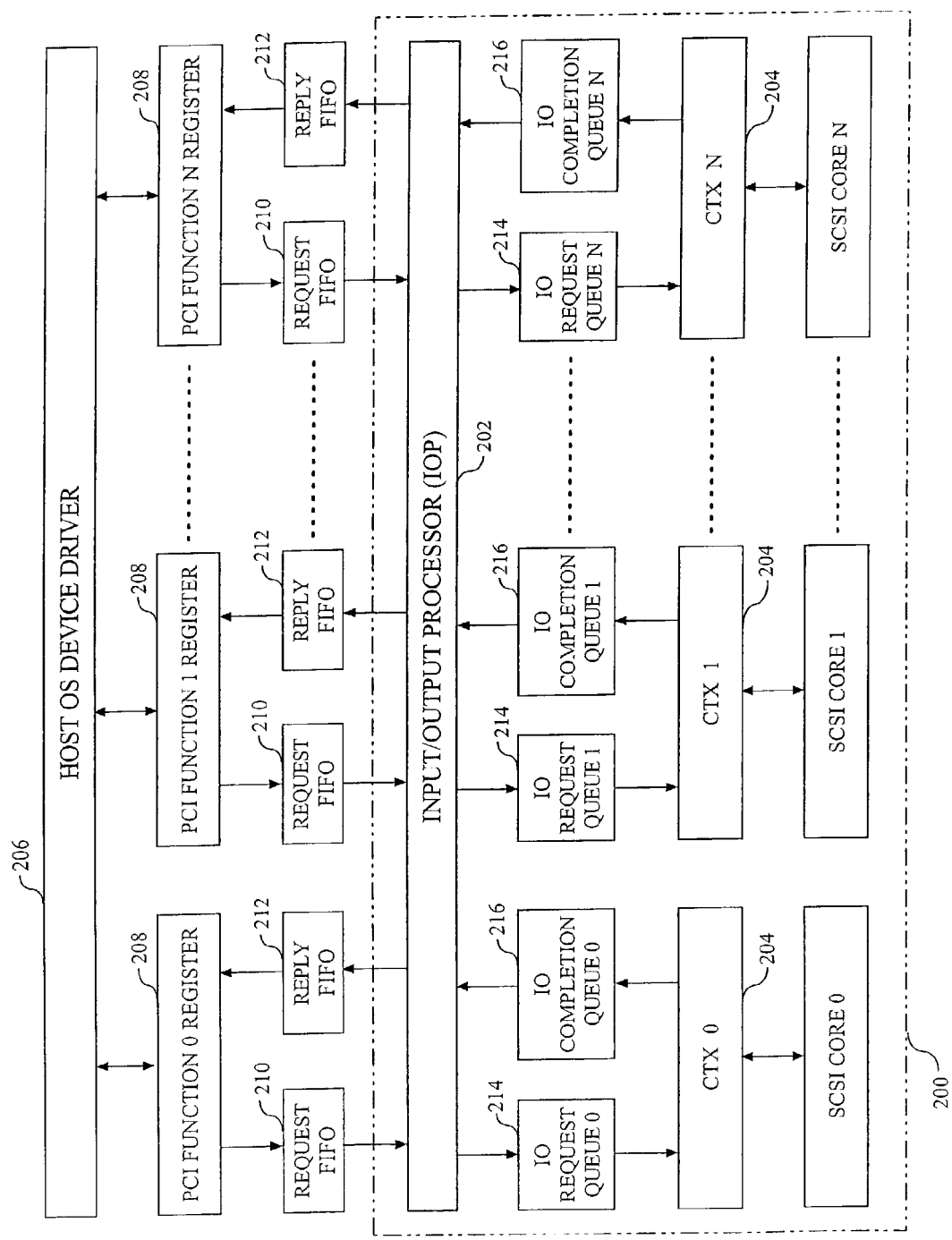
FIG. 2 shows a block diagram of an exemplary SCSI MPT (Message Passing Technology) based controller in which the present invention may be implemented, and its relationship with a host operating system (OS) device driver.

FIG. 2 shows a block diagram of an exemplary SCSI MPT (Message Passing Technology) based controller 200 in which the present invention may be implemented, and its relationship with a host OS device driver 206. The MPT based controller 200, which is an exemplary embodiment of the SCSI controller 112 shown in FIG. 1, is a multi-processor design and includes one input/output processor (IOP) 202 and at least one context manager (CTX) processor. Each of the processors has a dedicated set of firmware. The IOP 202 may be implemented using a number of known processors, including an ARM microprocessor core available from Advanced RISC Machines Ltd., located in Cambridge, England. The CTX processor may be implemented using a number of different processors, such as another ARM microprocessor, a specialized sequencer, or the like.

The CTXs 204 handle the dedicated bus protocol of the chip, for example, SCSI, Fibre Channel, Serial ATA, or the like. The term Context Manager (CTX) describes the whole dedicated hardware components that make up the bus or protocol channel, not just the CTX processor. The controller 200 may be a single-channel (single bus) design or a multi-channel (i.e., two or more buses) design. In a single-channel design, there is only one CTX. In a multi-channel design, there is a dedicated CTX for each channel. For example, in FIG. 2, CTX 0 is for Channel 0, CTX 1 is for Channel 1, and CTX N is for Channel N. Every single CTX 204 also has a dedicated set of inter-processor queues (IO request queues 214 and IO completion queues 216) used to communicate between itself and the IOP 202. In a multi-channel design, the CTXs 204 may not communicate between each other, and each CTX 204 communicates with the IOP 202 only.

There is a set of dedicated FIFOs through which the host OS device driver 206 and the IOP 202 communicate for each channel. These are the request FIFOs 210 and the reply FIFOs 212. In a multi-channel design, there is a dedicated set of these FIFOs for each PCI function register 208. Each PCI function register 208 has a one to one relation with a CTX channel. For example, PCI function 0 register is for Channel 0, PCI function 1 register is for Channel 1, and PCI function N register is for Channel N.

The IOP 202 polls an interrupt status register for new IO request from the OS device driver 206. Polling refers to a technique for handling devices which does not rely on the devices themselves to generate interrupts when the devices need attention, but rather lets the processor poll the devices to service their needs. Polling gives more control to the processor on when and how to handle devices.

For each channel, when the IOP 202 receives an IO request posted by the OS on the request FIFO 210, the IOP 202 may perform some processing on the IO request and then send the IO request on the corresponding inter-processor IO request queue 214. The CTX 204 may poll the corresponding IO request queue 214 for the IO request. When the CTX 204 has completed processing the IO request, the CTX 204 replies back to the IOP 202 with the status of the IO request via the corresponding inter-processor IO completion queue 216. The IOP 202 then polls the IO completion queue 216 so as to complete a polling loop by the IOP 202.

After the IOP 202 receives replies from each of the CTXs 204 on the IO completion queues 216, the IOP 202 performs some cleanup and then sends the status of the IO request back to the OS device driver 206 via the reply FIFOs 212.

In the MPT based controller 200 shown in FIG. 2, the IOP 202 plays the "middleman" between the OS device driver 206 and the CTXs 204. In a normal operation, the IOP 202 continually receives IO requests from the OS device driver 206, passes the IO requests along to the CTXs 204, receives IO completions from the CTXs 204 and passes IO completions along to the OS device driver 206. When the IOP firmware receives IO completions from the CTXs 204, the IOP firmware posts to the reply FIFOs 212 the unaltered message context on a successful IO operation, or a source address on an IO failure. This automatically generates an interrupt to the OS, letting the OS know that there is a message to be processed.

Interrupt coalescing allows for the generation of the interrupt to be delayed, based on coalescing interrupt generation delay variables such as coalescing timeout, a coalescing depth, or the like. For example, a counter may be set and an interrupt to the host is generated when the timer reaches 0. Alternatively, a host interrupt may be generated when the number of reply FIFO entries meets a coalescing depth. Manipulations of these interrupt generation delay variables may allow for efficient use of data transfer resources between the host and the IOP 202, resulting in increased performance and throughput.

However, the benefit of interrupt coalescing is marginalized with large IOs, and may have a negative impact on performance when serialized IOs are the dominant load. The present invention may dynamically enable and disable interrupt coalescing in a data processing system, based on IO load characteristics. The present invention may be utilized to maintain maximum performance of a SCSI MPT based controller, regardless of differences in IO characteristics.

It is understood that even though FIG. 2 shows a SCSI MPT based controller, the present invention may be implemented in other MPT based controllers, including but not limited to SAS, SATA, Fiber Channel, ISCSI, LAN, ATA, IDE controllers. The present invention may also be implemented in other IO adapters, such as a different kind of SCSI controller, a fibre channel arbitrated loop (FC-AL) adapter, a 1394 adapter, a universal serial bus (USB) adapter, or the like.

Figure 3:
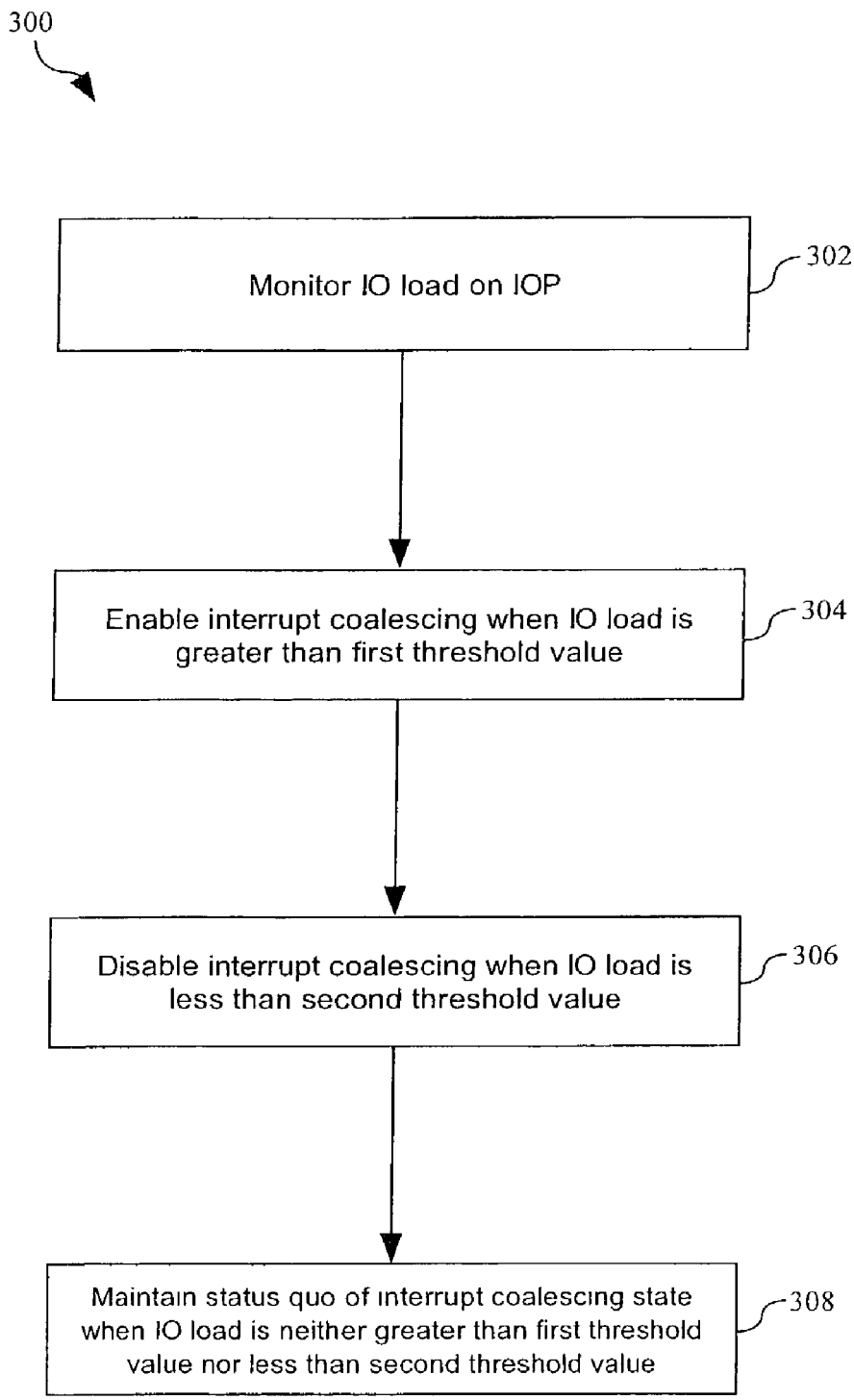
FIG. 3 is a flow chart of an exemplary process used for dynamically enabling and disabling interrupt coalescing in a data processing system in accordance with the present invention.

Referring to FIG. 3, a flow chart of an exemplary process 300 used for dynamically enabling and disabling interrupt coalescing in a data processing system in accordance with the present invention is shown. The process 300 starts with monitoring the IO load on an IOP 302. When the IO load is greater than a first predetermined threshold value, the interrupt coalescing feature may be enabled 304. When the IO load is less than a second predetermined threshold value, the interrupt coalescing feature may be disabled 306. The second predetermined threshold value is a value less than the first predetermined threshold value. When the IO load is neither greater than the first predetermined threshold value nor less than the second predetermined threshold value, the status quo of the interrupt coalescing state is maintained 308. In other words, when the IO load is greater than or equal to the second predetermined threshold value but is less than or equal to the first predetermined threshold value, the status quo of the interrupt coalescing state is maintained. An interrupt coalescing state is either a state in which the interrupt coalescing feature is enabled or a state in which the interrupt coalescing feature is disabled.

In the process 300 shown in FIG. 3, following Step 304, instead of proceeding to Steps 306 and 308, an alternative step (not shown) may be followed, at which the interrupt coalescing feature may be disabled when the IO load is not greater than the first predetermined threshold value.

By dynamically enabling and disabling the interrupt coalescing feature in a data processing system based on IO load characteristics, the present invention may greatly improve overall IO throughput.

Figure 4:
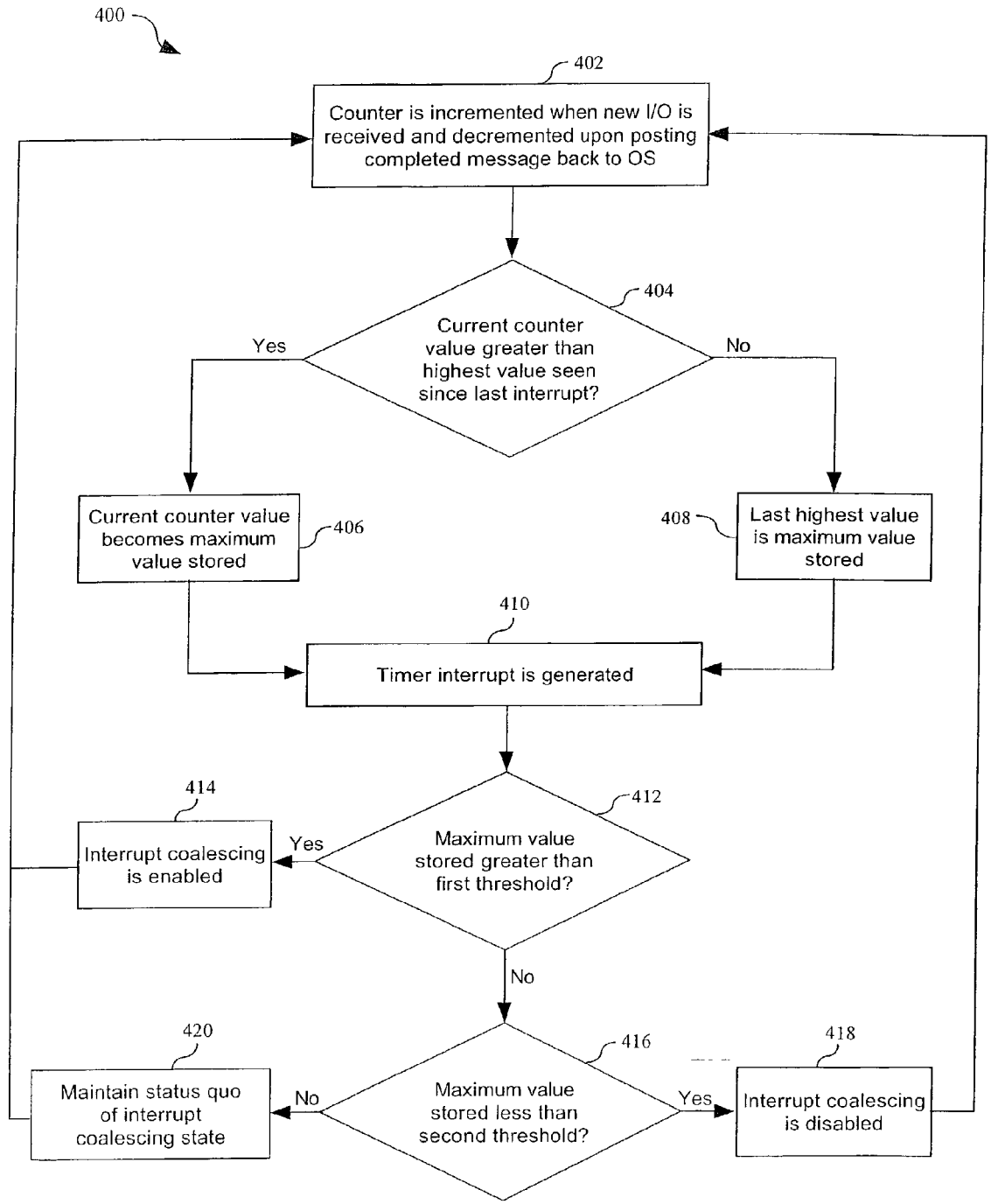
FIG. 4 shows a flow chart of a process, which is an exemplary embodiment of the process shown in FIG. 3.

FIG. 4 shows a flow chart of a process 400, which is an exemplary embodiment of the process 300 shown in FIG. 3. The process 400 involves consistently monitoring IO load on the IOP of an IO adapter. The firmware on the IO adapter may have a global variable that stores counters for PCI function registers. Each counter tracks the number of outstanding IOs of a corresponding PCI function register. The process 400 starts with Step 402, at which the counter is incremented whenever a new IO is received, and is decremented upon posting the completed message back to the OS. A timer interrupt may be generated periodically so that an ISR may be periodically performed. For example, a timer interrupt may be generated every second by hardware of the data processing system. As the IOP iterates its polling loop, the current value of each counter is compared with a store of the highest value of that counter seen since last timer interrupt to see if the current counter value is greater 404. When the current value is greater, the current value becomes the maximum value stored of that counter 406. When the current value is not greater, the highest value seen since last timer interrupt is the maximum value stored of that counter 408.

When a timer interrupt is generated 410, in the ISR triggered by the timer interrupt, the maximum value stored of each counter seen since last timer interrupt is analyzed to see if the maximum value stored is greater than a first predetermined threshold value 412. When the maximum value stored is greater than the first predetermined threshold value, interrupt coalescing is enabled 414, and the process 400 then returns to Step 402. In other words, when IO loads are large enough, the interrupt coalescing feature is enabled.

When the maximum value stored is not greater than the first predetermined threshold value, the maximum value stored is compared with a second predetermined threshold value 416. The second predetermined threshold value is a value less than the first predetermined threshold value. When the maximum value stored is less than the second predetermined threshold value, interrupt coalescing is disabled 418, and the process 400 then returns to Step 402. In other words, when IO loads are small enough, the interrupt coalescing feature is disabled. When the maximum value stored is not less than the second predetermined threshold value, the status quo of the interrupt coalescing state is maintained 420, and the process 400 then returns to Step 402. In other words, when IO loads are neither large enough nor small enough, the interrupt coalescing state immediately before the current timer interrupt is kept.

In the process 400 shown in FIG. 4, following Steps 412 and 414, instead of proceeding to Step 416, an alternative step (not shown) may be followed, at which the interrupt coalescing feature may be disabled when the IO load is not greater than the first predetermined threshold value, and the process 400 then returns to Step 402.

FIG. 5 is an exemplary "C" pseudo code used to demonstrate the algorithm described in FIG. 4. Specifically, when Max Outstanding IO Count, i.e., the maximum value stored shown in FIG. 4, is less than Dynamic_Coalescing_Threshold_Min, i.e., the second predetermined threshold value shown in FIG. 4, interrupt coalescing is disabled. When Max Outstanding IO Count is greater than Dynamic_Coalescing_Threshold_Max, i.e., the first predetermined threshold value shown in FIG. 4, interrupt coalescing is enabled. When Max Outstanding IO Count is less than or equal to Dynamic_Coalescing_Threshold_Max and greater than or equal to Dynamic_Coalescing_Threshold_Min, the status quo of the interrupt coalescing state is maintained.

By dynamically enabling and disabling the interrupt coalescing feature in a data processing system based on IO load characteristics, the present invention may greatly improve overall IO throughput. Thus, maximum performance may be maintained regardless of IO load characteristics.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for dynamically enabling and disabling interrupt coalescing in a data processing system, comprising:
   providing a counter suitable for tracking input/output load of an input/output processor, wherein the counter is incremented when a new input/output request is received by the input/output processor, and is decremented when the input/output processor posts a completed message back to a host processor;
   generating a timer interrupt periodically so that an interrupt service routine is periodically performed;
   comparing a current value of the counter with a store of a highest value of the counter seen since last timer interrupt when the input/output processor iterates a polling loop, wherein the current value becomes a maximum value stored when the current value is greater, and the highest value is the maximum value stored when the current value is not greater;
   comparing the maximum value stored with a first predetermined threshold value in the interrupt service routine; and
   enabling the interrupt coalescing when the maximum value stored is greater than the first predetermined threshold value.

2. The method of claim 1, further comprising disabling the interrupt coalescing when the maximum value stored is not greater than the first predetermined threshold value.

3. The method of claim 1, further comprising disabling the interrupt coalescing when the maximum value stored is less than a second predetermined threshold value, wherein the second predetermined threshold value is a value less than the first predetermined threshold value.

4. The method of claim 3, further comprising maintaining a status quo of an interrupt coalescing state when the maximum value stored is neither greater than the first predetermined threshold value nor less than the second predetermined threshold value.

5. An apparatus for dynamically enabling and disabling interrupt coalescing in a data processing system, comprising:
   means for providing a counter suitable for tracking input/output load of an input/output processor, wherein the counter is incremented when a new input/output request is received by the input/output processor, and is decremented when the input/output processor posts a completed message back to a host processor;
   means for generating a timer interrupt periodically so that an interrupt service routine is periodically performed;
   means for comparing a current value of the counter with a store of a highest value of the counter seen since last timer interrupt when the input/output processor iterates a polling loop, wherein the current value becomes a maximum value stored when the current value is greater, and the highest value is the maximum value stored when the current value is not greater;
   means for comparing the maximum value stored with a first predetermined threshold value in the interrupt service routine; and
   means for enabling the interrupt coalescing when the maximum value stored is greater than the first predetermined threshold value.

6. The apparatus of claim 5, further comprising means for disabling the interrupt coalescing when the maximum value stored is not greater than the first predetermined threshold value.

7. The apparatus of claim 5, further comprising means for disabling the interrupt coalescing when the maximum value stored is less than a second predetermined threshold value, wherein the second predetermined threshold value is a value less than the first predetermined threshold value.

8. The apparatus of claim 7, further comprising means for maintaining a status quo of an interrupt coalescing state when the maximum value stored is neither greater than the first predetermined threshold value nor less than the second predetermined threshold value.

9. An apparatus for dynamically enabling and disabling interrupt coalescing in a data processing system, comprising:
   a host processor including a PCI function register;
   a counter suitable for tracking a number of outstanding input/output load of the PCI function register, wherein the counter is incremented when a new input/output request is received, and is decremented upon posting a completed message back to the host processor;
   an IO adapter coupled to the host processor, wherein the IO adapter includes an input/output processor suitable for enabling and disabling interrupt coalescing and suitable for iterating a polling loop, and wherein firmware on the IO adapter has a global variable that stores the counter;
   means for generating a timer interrupt periodically so that an interrupt service routine is periodically performed;
   means for comparing a current value of the counter with a store of a highest value of the counter seen since last timer interrupt when the input/output processor iterates the polling loop, wherein the current value becomes a maximum value stored when the current value is greater, and the highest value is the maximum value stored when the current value is not greater; and means for comparing the maximum value stored with a predetermined threshold value in the interrupt service routine.

10. The apparatus of claim 9, wherein the IO adapter is a MPT based controller.

11. The apparatus of claim 10, wherein the MPT based controller is of a single-channel design.

12. The apparatus of claim 11, wherein the MPT based controller is a SCSI controller.

13. The apparatus of claim 10, wherein the MPT based controller is of a multi-channel design.

14. The apparatus of claim 13, wherein the MPT based controller is a SCSI controller.

15. The apparatus of claim 10, wherein the input/output processor is based on an ARM microprocessor core.

* * * * *